Sept. 6, 1966　　　J. L. LANSCH　　　3,271,752
PIPE-TYPE CABLE CONTROLLER COMPRISING SELF-TESTING FEATURES
Original Filed July 25, 1960　　　9 Sheets-Sheet 1

INVENTOR.
JOHN L. LANSCH
BY
V. F. Volk
agent

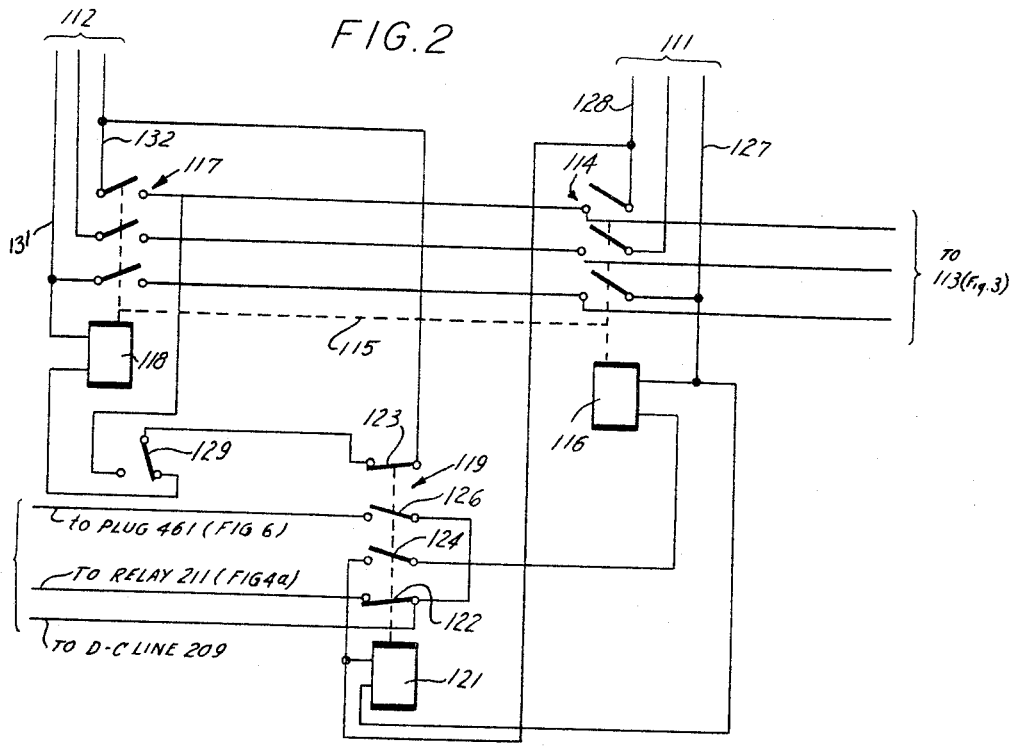
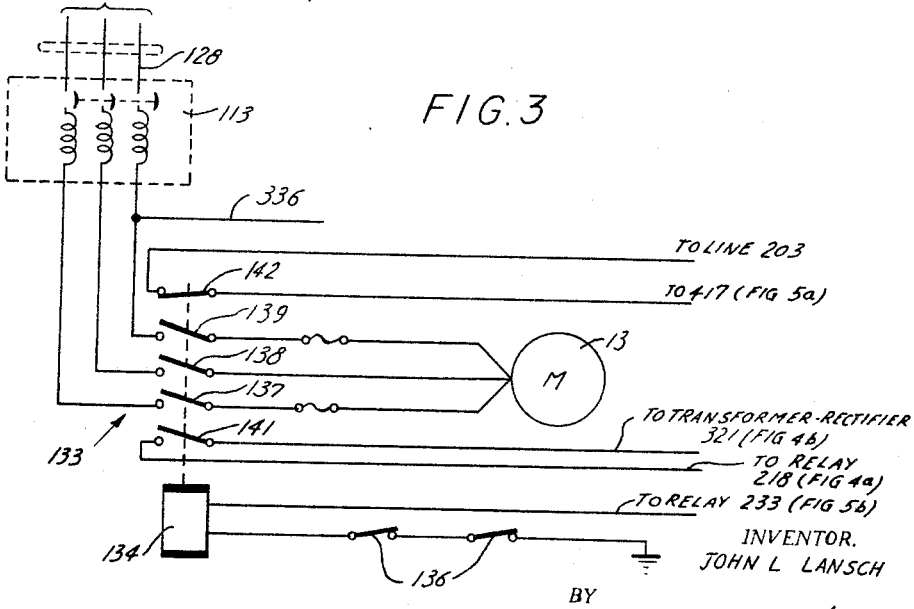

Sept. 6, 1966     J. L. LANSCH     3,271,752
PIPE-TYPE CABLE CONTROLLER COMPRISING SELF-TESTING FEATURES
Original Filed July 25, 1960     9 Sheets-Sheet 3

FIG. 4a

INVENTOR.
JOHN L. LANSCH
V. F. Volk
agent

Sept. 6, 1966        J. L. LANSCH        3,271,752
PIPE-TYPE CABLE CONTROLLER COMPRISING SELF-TESTING FEATURES
Original Filed July 25, 1960        9 Sheets-Sheet 4

FIG. 4b

INVENTOR
JOHN L. LANSCH
BY
J F Jock
agent

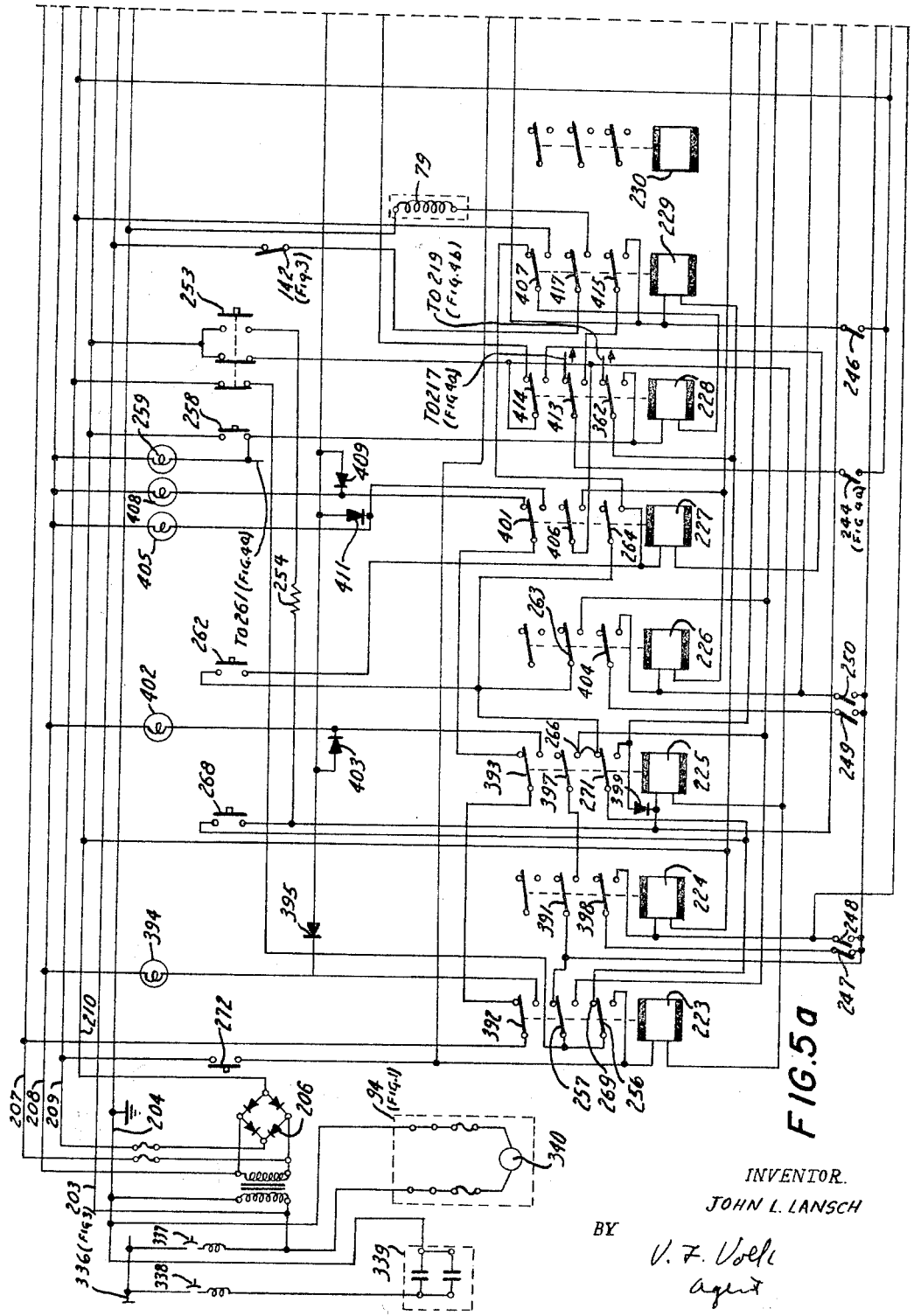

Sept. 6, 1966  J. L. LANSCH  3,271,752
PIPE-TYPE CABLE CONTROLLER COMPRISING SELF-TESTING FEATURES
Original Filed July 25, 1960  9 Sheets-Sheet 6
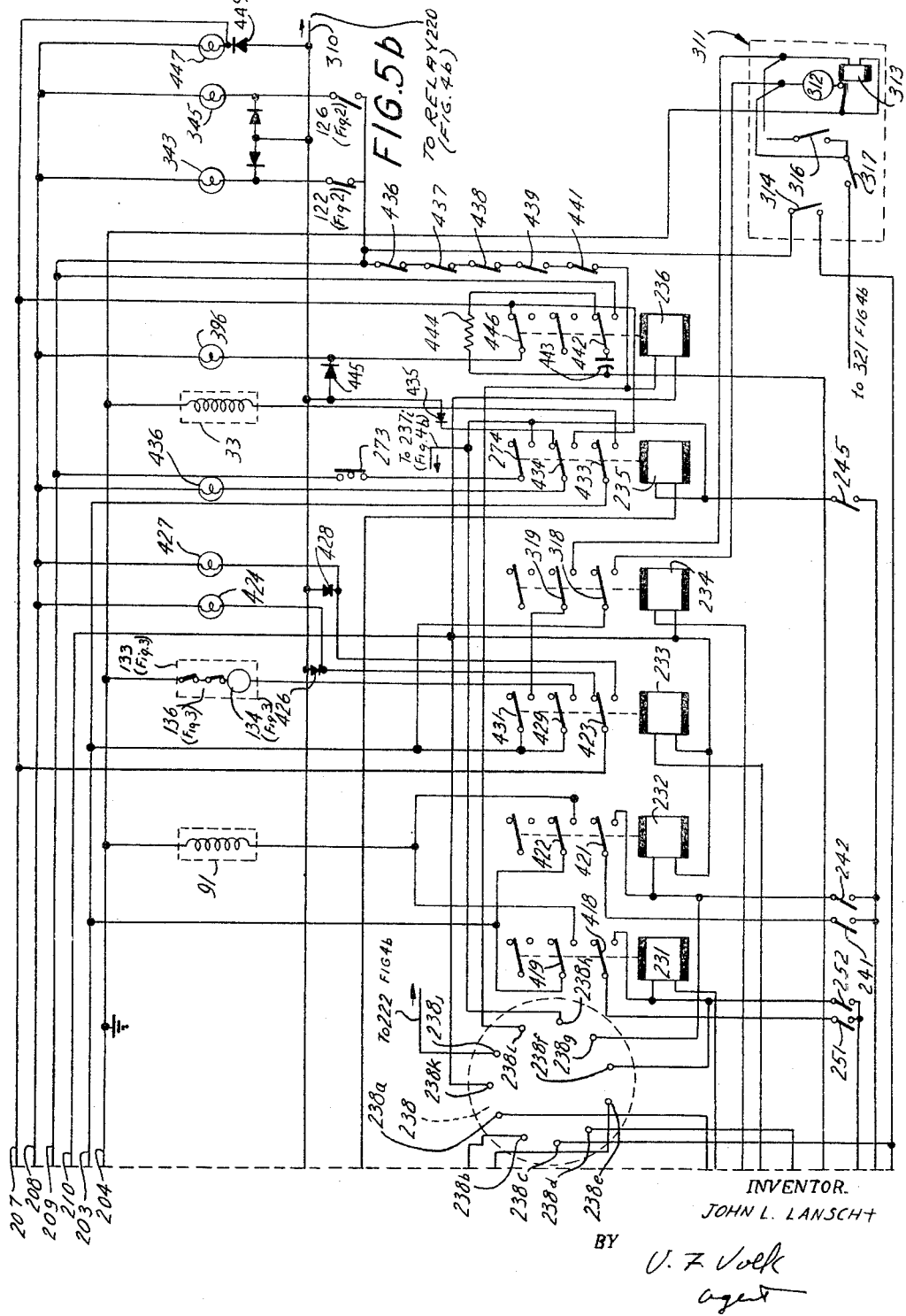
INVENTOR.
JOHN L. LANSCH
BY
U. F. Volk
agent

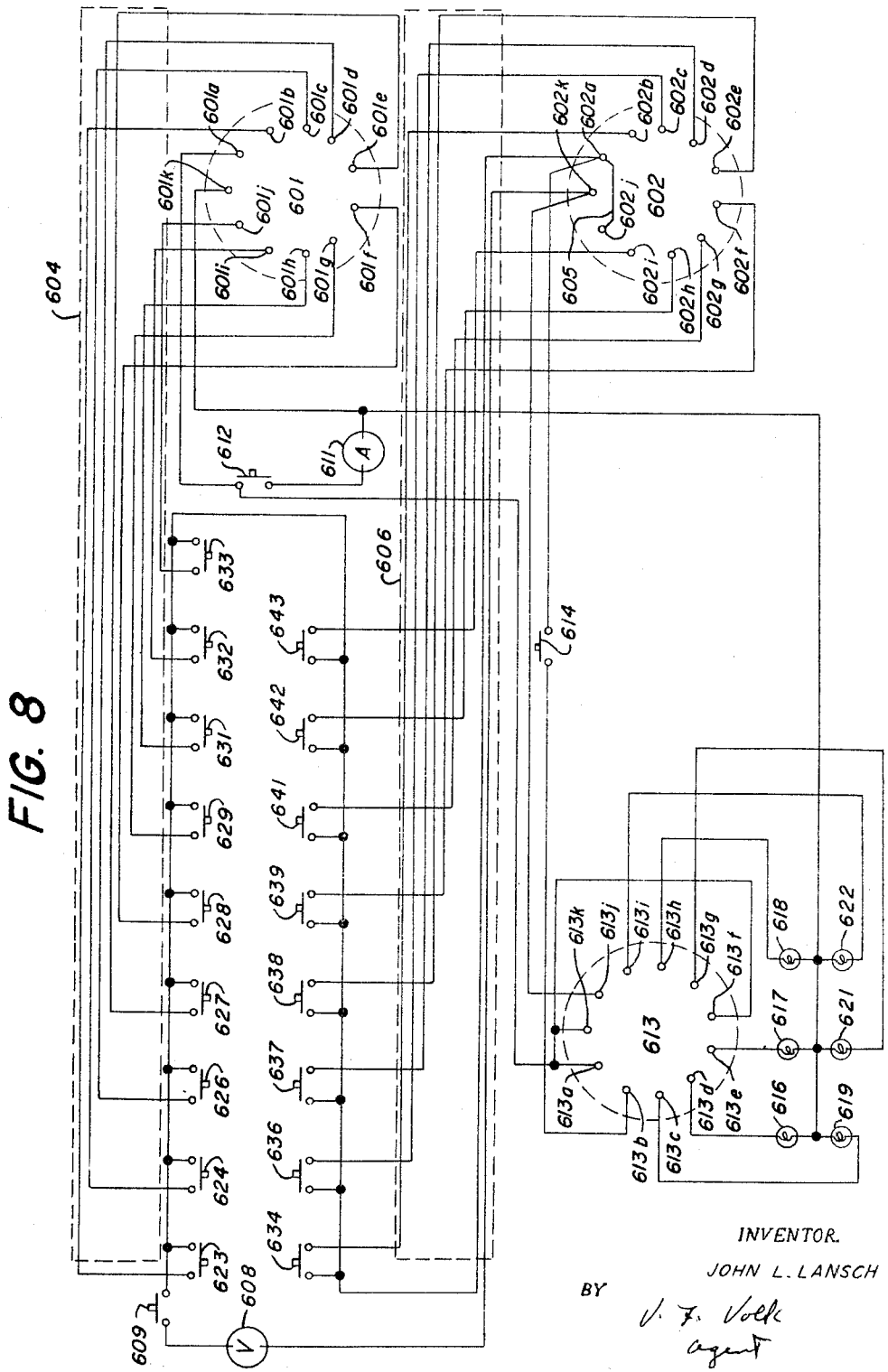

United States Patent Office 3,271,752
Patented Sept. 6, 1966

3,271,752
PIPE-TYPE CABLE CONTROLLER COMPRISING SELF-TESTING FEATURES
John L. Lansch, Nyack, N.Y., assignor, by mesne assignments, to Anaconda Wire and Cable Company, a corporation of Delaware
Original application July 25, 1960, Ser. No. 45,115, now Patent No. 3,155,765, dated Nov. 3, 1964. Divided and this application Oct. 1, 1964, Ser. No. 414,042
3 Claims. (Cl. 340—214)

This application is a division of Patent No. 3,155,765, issued Nov. 3, 1964.

My invention relates to apparatus for maintaining oil pressure in a pipe-type cable system and particularly to such apparatus incorporating automatic switch-over devices responsive to failures in the electric or hydraulic components of the system.

In pipe-type cables electrical conductors insulated for high voltage service, by which I mean service at voltages usually above 15 kv. and as high or higher than 230 kv., are laid in a fluid-tight pipe which is kept filled with electrical insulating grade oil under pressure. The insulation used for pipe-type cable is almost universally a plurality of layers of paper which is penetrated by the insulating oil. To achieve adequate dielectric strength while the cable is energized the insulating oil is maintained at a high pressure which has become standardized at about 200 p.s.i.g. To maintain the purity of the oil it is also highly desirable to maintain positive pressure in the line at all times even though the cable is inoperative. This pressure need not be as high as the pressure maintained around the conductors when they are energized and I prefer to keep a pressure of about 60 p.s.i.g. on the cable when it is deenergized.

A pipe-type cable is usually an expensive engineering installation supplying power to important industrial and utility systems where any interruption of service will involve large economic losses. I have therefore incorporated in my apparatus alarms and automatic safeguards to prevent minor irregularities in the system from progressing to the point of a power shutdown.

During normal operation of a pipe-type cable the oil in the pipe will expand and contract periodically and provision must be made to store the excess oil during periods of expansion, and to maintain adequate pressure during periods of contraction. The oil expands because it is heated either by transfer of heat from the electrical conductors when they are under load, or by transfer of heat through the pipe from the outside surroundings.

To accommodate the excess oil during periods of expansion I have provided one or more reservoirs or tanks connected by means of a novel combination of piping and check valves, and mechanical and magnetic relief valves to the pipe-type cable. To maintain pressure in the pipe-type cable during periods of contraction of the oil I have provided one or more controllers, each incorporating a pump for returning oil from the reservoir into a pipe-type cable. Although I prefer to use pumps to build up oil pressure it will be understood that other pressure means such as pressure supplied from gas cylinders, may also be used.

I have provided a novel combination of controls and local and remote alarms, said controls and alarms being controlled by a plurality of relays. Said relays, in my invention, are of an interchangeable, plug-in type whereby any relay failure may be immediately corrected by the insertion of a spare relay for which I have provided a special receptacle to replace the faulty member. I have also provided a novel built-in means for testing the circuitry of my apparatus without interrupting the operation thereof and without setting off any remote false alarms.

I have provided my apparatus with means whereby, when a plurality of pumps are used, failure or inadequacy of one pump to maintain pressure in an associated portion of the system will automatically open connectors to the output from an adjacent pump and I have also provided that this automatic cross over shall take place only during operation of the pipe-type cable at normal pressure.

I have provided my apparatus with a novel combination of mechanical and magnetic relief valves whereby I am able to control the pressure in a pipe-type cable within much closer limits than has heretofore been practicable.

I have provided my system with means whereby upon failure of a normal source of power the apparatus will switch over to an auxiliary source, and I have also provided that such momentary interruptions of power shall not set off any remote alarms and that following a power interruption the system shall automatically resume a type of operation whereby it maintains the pipe-type cable at normal pressure.

Prior art devices for regulating the pressure in pipe-type cables have involved separate and distinct systems for control and for alarm. In my system there is a close integration of the alarm and control function whereby the same relay that operates a control valve or other mechanism is interlocked with alarm circuits when necessary.

My system comprises novel interlocking circuitry whereby only certain sequences of operations which may be known only to selected authorized persons may be followed to change to reduced pressure operation or to change from manual to automatic controls.

I have further provided that connection between the operating elements of my system and the control panels shall be made by means of a plurality of plugs and matching receptacles whereby it is possible to isolate sections of the system for the purpose of making changes or repairs. In addition I have provided an interlock which will show an alarm when any of the aforementioned plugs are not connected to their receptacles.

Means are provided in my apparatus to maintain pumping actions until pressure has risen at the remote ends of the pipe-type cable and to show an alarm for excessive cycling or failure of pumping action to reach the required pressure within a reasonable time.

I have incorporated in my system novel means for simultaneously testing all the signal lamps including the lamps in the control circuits without at the same time interrupting the normal operation of my apparatus.

Further advantages and objects of my invention will be made apparent by consideration of the appended drawings and the detailed descriptions thereof.

In the drawings:

FIG. 2 is a wiring diagram of the power transfer switch of one embodiment of my invention.

FIG. 3 is a wiring diagram of the main power circuit breaker and motor starter for the pump of my invention.

FIGS. 4a and 4b combined are a wiring diagram of a portion of the apparatus of my invention.

FIGS. 5a and 5b combined are a wiring diagram of another portion of the apparatus of my invention.

Figure 6:
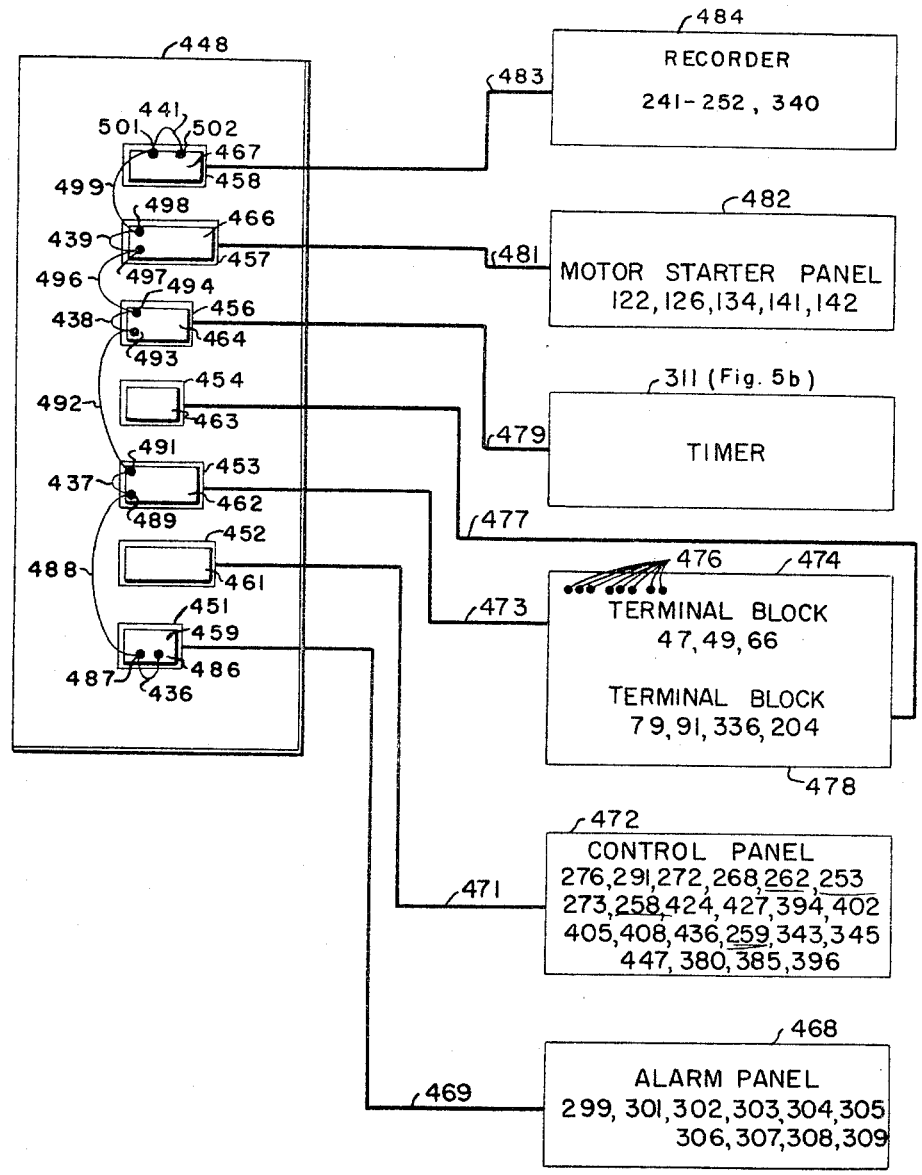

FIG. 6 is a block diagram of a feature of my invention.

Figure 7:
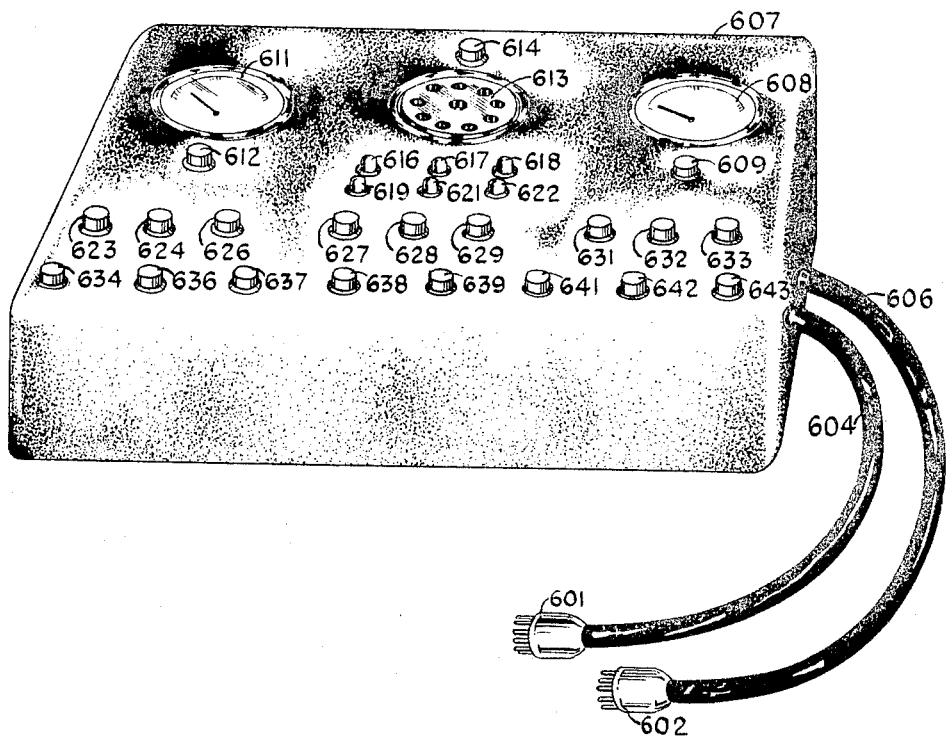

FIG. 7 is a perspective view of a test unit of my invention.

FIG. 8 is a wiring diagram of a test unit of my invention.

Figure 1:
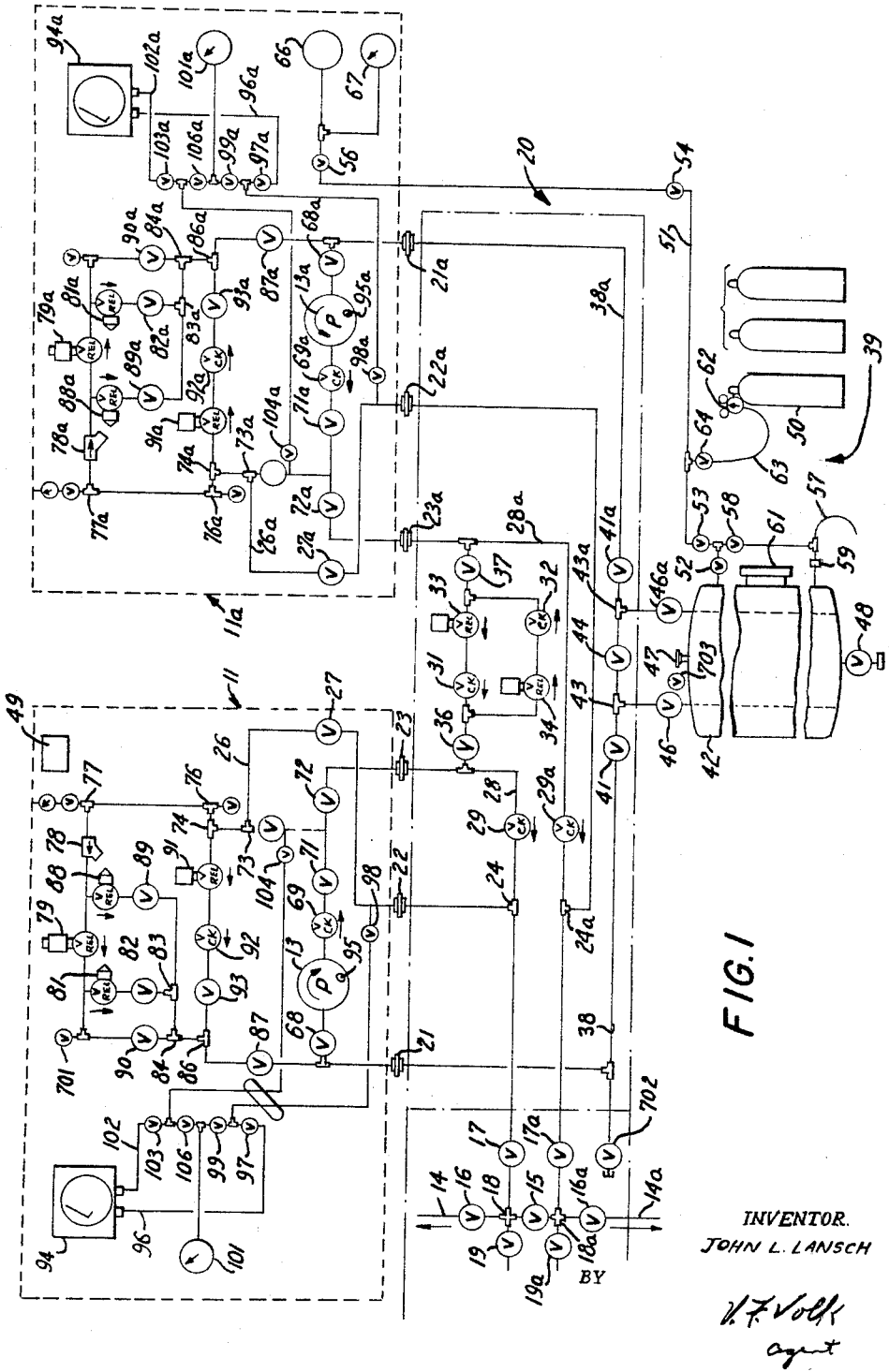
FIG. 1 is a schematic diagram of the apparatus and piping of one embodiment of my invention.

Referring to FIGURE 1 twin controllers designated generally 11, 11a mounting high pressure pumps 13, 13a are connected through pipe lines 14, 14a to a pipe-type cable, not shown, within which it is desired to maintain oil at an elevated pressure, such as a pressure of 200 p.s.i.g. It is required that this pressure shall be maintained in the system within a narrow range notwithstanding changes in temperature causing expansion and contraction in the oil, or slow leaks or seepage of oil from the system. It is also required that appropriate alarms be given at the controllers and possibly at one or more remote stations in the event of a large leak or of loss of power to the pumps 13, 13a or other emergencies as shall be hereinafter described.

I have shown the twin controllers 11, 11a associated with pipe lines 14, 14a but a single controller such as 11a may be used for a pipe-type cable system not large enough to require twin controllers. Where twin controllers are used they may be installed at a joint in a relatively long pipe-type cable with the pipe line 14 connected to the pipe-type cable on one side of the joint and the pipe line 14a connected to the same pipe-type cable at the other side of the joint.

The pipe lines 14 and 14a for which I prefer to use 2-inch steel pipe, are joined at a normally closed manual stop valve 15 and flow through the lines can be controlled by a pair of normally open manual valves 16, 16a downstream and 17, 17a upstream of a pair of cross couplings 18, 18a. A pair of normally closed manual valves 19, 19a each seal off one leg of the cross couplings 18, 18a affording provision for possible future connections.

I prefer to assemble certain valves and other equipment to be described in a trench 20 from which pipe connections are made to the controllers 11, 11a through O-ring sealed unions 21, 21a, 22, 22a and 23, 23a.

The upstream sides of the valves 17, 17a are joined through T's 24, 24a and the unions 22, 22a to the pipe lines 26, 26a controlled by normally open manual stop valves 27, 27a. Within the trench 20 I have laid the pipe lines 28, 28a connecting respectively, the T's 24, 24a to the unions 23, 23a. Check valves 29, 29a in lines 28, 28a prevent flow in said lines back from the T's 24, 24a.

Connecting the pipe lines 28, 28a, I have placed a cross-over system comprising check valves 31 and 32, normally closed magnetic relief valves 33 and 34 and normally open manual stop valves 36 and 37; also in the trench 20 I have included a pipe line 38, 38a connected to the oil storage reservoir system generally designated by the numeral 39. The line 38, 38a is connected to the controllers 11, 11a through the unions 21, 21a respectively under the control of normally open manual stop valves 41, 41a. Entry to an oil storage tank 42 takes place through two T's 43, 43a in the pipe lines 38, 38a isolated by a normally closed stop valve 44. Entry into the tank 42 is further controlled by normally open manual stop valves 46, 46a.

The oil tank 42 is equipped with an oil level indicator alarm 47 and an oil drain controlled by a normally closed manual stop valve 48. A thermostat 49 has been located on the controller 11 but may be placed at any convenient location in the pump room. A cylinder 50 of dry inert gas of which nitrogen is a preferred example provides an inert atmosphere to the tank 42 through the pipe line 51 having normally open manual stop valves 52, 53, 54 and 56. The pipe line 51 for which I prefer to use half-inch copper piping is connected to a safety vent 57 through a normally closed manual stop valve 58. The vent 57 is connected to the oil tank 42 through a safety head diaphragm 59. A manhole 61 provides entrance to the tank 42 for the purpose of cleaning.

The cylinder 50 is equipped with a regulator 62 connected by means of the flexible hose 63 and normally open manual stop valve 64 to the pipe line 51. The valve 56 is located in the controller 11a which also contains a pressure alarm 66 and pressure gauge 67 connected to the pipe line 51. Oil leaving the tank 42 enters through the pipe lines 38, 38a and the unions 21, 21a through normally open manual stop valves 68, 68a into the pumps 13, 13a. The pumps 13, 13a force the oil from the storage tank 42 through check valves 69, 69a, normally open manual stop valves 71, 71a and 72, 72a and the valves 29, 29a, 17, 17a and 16, 16a into the pipe-type cable.

A return oil circuit between the tank 42 and the pipe-type cable is provided through the pipe line 14, the valves 16, 16a, the cross couplings 18, 18a, the valves 17, 17a, the T's 24, 24a, the unions 22, 22a, the valves 27, 27a, the pipe lines 26, 26a, the T's 73, 73a, 74, 74a, 76, 76a, 77, 77a through strainers 78, 78a, normally open magnetic relief valves 79, 79a, normally closed mechanical relief valves 81, 81a, normally open manual stop valves 82, 82a, T's 83, 83a, 84, 84a, 86, 86a, normally open manual stop valves 87, 87a, the unions 21, 21a, the pipe lines 38, 38a, the valves 41, 41a and 46, 46a. The valves 81, 81a are closed until the pressure in the oil reaches some predetermined value which I prefer should be 225 p.s.i.g.

A pair of valves parallel to the valves 81, 81a and 82, 82a are provided by normally closed mechanical relief valves 88, 88a and normally open manual stop valves 89, 89a. I prefer to have the valves 88, 88a set to open at a pressure of 250 p.s.i.g. Valves 90, 90a are normally closed manual valves closing a circuit parallel to the circuits provided through the valves 81, 82 (81a, 82a) and 88, 89 (88a, 89a). Parallel to the lines comprising respectively the strainers 78, 78a, the valves 88, 88a, 79, 79a, 81, 81a, 89, 89a and 82, 82a are lines connected to the T's 74, 74a including normally closed magnetic relief valves 91, 91a, check valves 92, 92a, and normally open manual stop valves 93, 93a. The magnetic relief valves 91, 91a are automatically opened at a predetermined pressure which I prefer should be 300 p.s.i.g. by means of a control circuit hereinafter to be described.

From the foregoing it will be evident that the mechanical valves 81, 81a, 88, 88a and the magnetic valves 91, 91a provide stepped means for relieving pressure transmitted from the pipe-type cable to the pipe lines 14, 14a by releasing oil into the tank 42. A further safeguard comprises built-in spring-loaded relief valves 95, 95a in the pumps 13, 13a. I prefer to use valves which will release when the pressure in the pumps reaches a value of 375 p.s.i.g.

The controllers 11, 11a contain oil pressure recorder and control units 94, 94a for which I prefer to use Foxboro Standard Recorders with dual rotax units such as number 77SDX77-799 special for 24-volt D.C. service, supplied by the Foxboro Company.

Each of the units 94, 94a includes two pressure actuated contact devices hereinafter to be described. The left-hand of said devices is connected through the pressure piping 96, 96a, normally open instrument stop valves 97, 97a, 98, 98a, unions 22, 22a, T's 24, 24a and pipe lines 14, 14a to the pipe-type cable. On the same pipe lines 96, 96a separated by normally open instrument stop valves 99, 99a are oil pressure gauges 101, 101a. It will be seen that the pressure in the left-hand devices of the units 94, 94a and in the oil pressure gauges 101, 101a being approximately equal to the pressure in the pipe-type cable. The left-hand devices may be used to actuate the automatic controls for the cable system.

The right hand devices of the units 94, 94a are connected through pressure piping 102, 102a, normally open instrument stop valves 103, 103a and 104, 104a to the discharge side of the pumps 13, 13a. Normally closed instrument stop valves 106, 106a separate the left hand piping 96, 96a from the right hand piping 102, 102a. The right hand devices are used to control the pumps 13, 13a.

In the event of damage to either of the pumps 13 or 13a said pumps can be isolated by closing the respective valves 68, 68a without interfering with the operation of the automatic controls actuated by oil pressure in the piping 96, 96a.

The piping of the controllers 11, 11a is interrelated in the manner hereinbefore described, the circuitry of the controller 11 is practically identical to the circuitry of controller 11a, so that the operation of only controller 11 will be described, with the understanding that the operation of controller 11a is, for the purpose of this application, practically identical.

Referring to FIGURE 2, power for the operation of the controller 11 and auxiliary equipment is received from a 3-phase normal supply system 111 which may conveniently be 208 volts phase-to-phase but may have other voltage values such as 220, 230, 240, and 440 volts. Power for the operation of my system can also be received from an emergency supply 112 having the same characteristics as the normal supply 111. Power from the normal supply 111 is fed to a main circuit breaker 113 through a 3-pole magnetic switch 114 actuated by a coil 116. Power from the emergency supply 112 is fed to the main circuit breaker 113 through a 3-pole magnetic switch 117 actuated by a coil 118. Switches 114 and 117 are mechanically interlocked by a known mechanism indicated by the dashed line 115 in such a manner that both the switches 114 and 117 may be open at the same time, either may be open with the other closed, but both of the switches 114 and 117 cannot be closed at the same time.

A 4-pole transfer relay 119 is actuated by a coil 121. The relay 119 comprises two normally closed switches 122, 123 and two normally open switches 124, 126.

The normally closed switch 122 of the relay 119 has one terminal connected with a terminal of the normally open switch 126. The normally open switch 124 has one terminal connected through the coil 116 with a phase 127 of the normal supply 111. The other terminal of the switch 124 is connected with a phase 128 of the normal supply 111 and is also connected through the coil 121 with the phase 127 of the normal supply 111. One terminal of the switch 123 is connected through an "on-off" switch 129 through the coil 118 with a phase 131 of the emergency supply 112. The other terminal of the switch 123 is connected with a phase 132 of the emergency supply 112. From the foregoing it will be apparent that when the normal power supply is energized current will pass through the coil 121 closing the switches 124, 126 which in turn will activate the coil 116 closing the power switch 114 so that the current from the normal supply can flow to the main circuit breaker 113. In the event of failure of the normal supply 111 the relay 119 will act to close the switch 123 thus energizing the coil 118 and closing the switch 117 to supply current from the emergency supply 112 to the main circuit breaker 113.

I have shown the normal power supply 111 and the emergency power supply 112 for my controller 11. It is advantageous to wire my controller 11a in such a manner that it will employ the supply 112 as a normal supply and the supply 111 as an emergency supply. Thus a dual controller system will in normal circumstances draw power from each of two sources of supply but continue to operate both controllers in the event of the failure of either source.

The pump 13 (FIGS. 1 and 3) receives power through a magnetic motor starter 133 (FIG. 3) actuated by the coil 134, which is in series with overload switches 136. The starter 133 comprises, in addition to the three phase-current switches 137, 138, 139, a normally open auxiliary switch 141 and a normally closed auxiliary switch 142.

The coil 134 is connected by means of relays hereinafter to be described between the phase 128 of the main circuit breaker 113 and ground.

Referring now to FIGURES 4a, 4b, 5a and 5b power for the operation of the controllers and their associated relays and alarms originates in a source of 120 volt A.C. made available through power lines 203 and 204 of which the line 204 is grounded or may be an insulated neutral. A transformer-rectifier 206 supplies 24 volt A.-C. to lines 207 and 208, 24 volt D.-C. positive to a line 209, and 24 volt D.-C. negative to a line 210. The D.-C. voltage supplied from the lines 209, 210 serves to activate the coils of three-pole double-throw relays 211 to 236 inclusive.

It is a feature of my invention that the relays 211 to 236 are of the interchangeable plug-in type. I have found that although all the poles are not invariably required such as is the case for the relay 226, it greatly facilitates the economical operation of my system to utilize relays which can be replaced by a standard spare and by a simple plugging in operation. I have also provided my controller with test receptacles 237 and 238 having contact points 237a–237k, and 238a–238k respectively.

The left hand pressure device of the unit 94 which is activated by the pressure in the piping 96 shown in FIG. 1 comprises a plurality of switches which operate in response to the pressure of the oil in the piping 96 in predetermined fashion according to principles that are well known. Accordingly a switch 241 will open when the pressure in the piping 96 drops below 250 p.s.i.g. and will close when the pressure rises above 250 p.s.i.g.; a switch 242 will open when the pressure in the piping 96 drops below 300 p.s.i.g. and will close when it rises above 300 p.s.i.g. A switch 243 (FIG. 4a) will open when the pressure drops below 260 p.s.i.g. and will close when the pressure rises above 260 p.s.i.g.; a switch 244 will close when the pressure drops below 160 p.s.i.g. and will open when the pressure rises above 160 p.s.i.g.; a switch 245 (FIG. 5b) will close when the pressure drops below 150 p.s.i.g. and will open when the pressure rises above 150 p.s.i.g.; and a switch 246 (FIG. 5a) will close when the pressure drops below 200 p.s.i.g. and will open when the pressure rises above 200 p.s.i.g. in the piping 96.

Similarly the right hand device in the unit 94 activated by the pressure in the piping 102 comprises an additional plurality of switches which operate in response to the pressure of the oil in the piping 102. A switch 247 (FIG. 5a) closes when the pressure in the piping 102 drops below 210 p.s.i.g. and opens when the pressure rises above 210 p.s.i.g.; a switch 248 closes when the pressure drops below 180 p.s.i.g. and opens when the pressure rises above 180 p.s.i.g.; a switch 249 closes when the pressure drops below 65 p.s.i.g. and opens when the pressure rises above 65 p.s.i.g.; a switch 250 closes when the pressure drops below 45 p.s.i.g. and opens when the pressure rises above 45 p.s.i.g.; a switch 251 opens when the pressure drops below 60 p.s.i.g. and closes when the pressure rises above 60 p.s.i.g.; a switch 252 opens when the pressure drops below 75 p.s.i.g. and closes when the pressure rises above 75 p.s.i.g.

One terminal of each of the switches 241 through 252 is connected through the line 209 with 24 volt D.-C. positive. The terminals of the switches 241 to 246 of the left hand device of the unit 94 are connected directly with the 24 volt line 209 while the switches 247 through 252 are connected through the relay 223 and a push button 253, which is the "off" button, to the 24 volt D.-C. line. From this circuit it will be evident that pressure on the "off" button 253 will deactivate the right hand switches 247 through 252 of the unit 94; similarly energizing the relay 223 will deactive the right hand switches 247 through 252.

The "off" pushbutton 253 is a momentary-contact pushbutton which in addition to the normally closed switch between the 24 volt negative D.-C. line 210 and the coil of the relay 223 just described has a normally open switch between the line 210 and the coil of the relay 225 in series with a resistor 254 for which I prefer a value of 100 ohms. The third switch, normally closed, of the pushbutton 253 connects the line 209 with a blade 256 and a blade 257 of the relay 223.

In addition to the "off" pushbutton 253 I have provided my circuit with a normally open, single-pole, "interlock," momentary-contact pushbutton 258 connecting the 24 volt negative D.-C. line with a red indicator lamp 259 and a resistor 261 which I prefer to have a value of 250 ohms. A single-pole, momentary-contact, normally open, "reduced pressure" pushbutton 262 connects the coil of the relay 227 with a blade 263 of the relay 226, a blade 264 of the relay 227 and a terminal 266 respectively of a relay 225. Another single-pole, momentary-contact, normally open "normal pressure" pushbutton 268 connects a terminal 269 of the relay 223 and a blade 271 of the relay 225 with the coil of the relay 225 and with the resistor 254.

A single-pole, normally open, momentary-contact "manual control" pushbutton 272 connects the positive D.-C. line 209 with the coil of the relay 223. A single-pole, normally open, momentary-contact "reset" pushbutton 273 connects the D.-C. positive line 209 with a blade 274 of the relay 235. A double-pole, momentary-contact "signal reset" pushbutton 276 comprises a normally open switch between the negative D.-C. line 210 and the line 277 connected as hereinafter described and a normally closed switch connecting the positive D.-C. line 209 with the line 278 connected through diode 330 with blades 279, 281, 282, 283, 284, 285, 286, 287, 288, 289 respectively of the relays 211, 212, 213, 214, 215, 216, 217, 218, 219 and 220. A double-pole, momentary-contact, "lamp test" pushbutton 291 comprises a normally open switch connecting the 24 volt A.C. line 207 with the normally closed terminals associated with the blades 349, 351, 352, 353, 354, 356, 357, 366 and 367 of the relays 212, 213, 214, 216, 217, 218, 219, 220 respectively, said blades being connected to the red alarm lamps 301, 302, 303, 304, 305, 306, 307, 308 and 309 and with the line 310 which line is connected with additional lamps as shall hereinafter be described. The pushbutton 291 also comprises a normally open switch connecting the negative D.-C. line 210 through the resistor 261, to the red lamp 259 and the coil of the relay 228.

A timer indicated generally at 311 comprises a motor-driven clock 312, solenoid 313 and switches 314, 316, 317 timed by the clock 312. For the timer 311 I prefer to use the type TSA–18 catalogue Number 695 x 37 Dual Electric Cycle Timer made by the General Electric Company. The operation of the switches 314, 316 and 317 in the timer 311 can be varied to suit the conditions of the system. In one typical insulation I prefer to set the timer 311 so that when the solenoid 313 is energized the switch 316 closes for the full time cycle of 60 minutes, the switch 314 closes for five minutes and then reopens and remains open for the duration of the cycle and the switch 317 remains open for approximately five and a half minutes and then closes for the remainder of the cycle. Thus there is a gap of approximately half a minute between the reopening of the switch 314 and the closing of the switch 317. The length of the time cycle for the switch 314 should be the experimentally determined time required to bring the remote end of the system up to pressure.

One terminal of the motor for the clock 312 and one terminal of the solenoid 313 of the timer 311 is connected with the ground wire 204. The other terminal of the motor for the clock 312 is connected with a normally open terminal associated with the blade 318 of the relay 234, and the other terminal of the solenoid 313 is connected with a terminal 319 of the relay 234. The switch 314 connects the positive D.-C. line 209 with the coil of the relay 224, the switch 317 connects the normally open terminal of the blade 318 of the relay 234 with one terminal of the high-voltage coil of a transformer-rectifier indicated as 321, and the switch 316 connects the normally open terminal associated with the blade 318 of the relay 234 to the normally open terminal associated with the blade 319 of the same relay.

The transformer-rectifier 321 has its power coil connected across the A.-C. lines 203 and 204 through the switch 317 of the timer 311. The transformer-rectifier 321 supplies 24 volt D.-C. having a common negative through the line 210 with the transformer-rectifier 206. The 24 volt D.-C. positive output from the transformer-rectifier 321 passes through the auxiliary switch 141 of the motor starter 133 (FIG. 3) to the coil of the relay 218. A capacitor 323 which I prefer to have a rating of 500 microfarads is connected in parallel with the D.-C. output of the transformer-rectifier 321.

A capacitor 324 which I prefer to have a rating of 500 microfarads on each of four upper plates has a lower plate connected with the line 277 and opposing plates connected with blades 326, 327, 328, 329 respectively of the relays 211, 212, 213, and 214. A capacitor 331 for which I prefer to use a unit identical with the capacitor 324 has one plate connected with the line 277 and opposing plates connected to blades 332, 333, 334, 335 respectively of the relays 215, 216, 217 and 218.

A lead 336 (FIG. 3) from the phase 128 of the main circuit breaker 113 furnishes power to the A.-C. line 203 and to the transformer-rectifier 206 through a circuit breaker 337 and to a lighting circuit receptacle 339 through a circuit breaker 338, and to a chart drive 340 of the unit 94 (FIG. 1) through the circuit breaker 337.

The relays 211, 212, 213, 214, 215, 216, 217, 218, 220, 221, 222, 232, 233, 234 and 236 all have one side of their coils connected directly with the D.-C. negative line 210. The relay 211 has the other side of its coil connected through the switch 122 with the D.-C. positive line 209, and the red signal lamp 343. The blade 341 of the relay 211 is connected with the A.-C. line 207 and has one terminal connected through a line 342 to a red lamp 343 (FIG. 5b) and the lamp 299 with the A.-C. line 208. The other terminal of the switch 341 of the relay 211 is connected through the line 344 and the green lamp 345 (FIG. 5b) with the line 208.

The blade 326 along with the blades 327, 328, 329, 332, 333, 334 and 335 are connected when their relays are deenergized through a resistor 346, which I prefer to have a value of 27 ohms with the negative plates of the capacitors 324 and 331. The normally open terminals associated with the blade 326 and the blades 327, 328, 329, 332, 333, 334 and 335 are connected through diodes with the positive D.-C. line 209.

A jumper 347 between the positive side of the coil of the relay 211 and the normally open terminal associated with the blade 279 supplies current to the coil once the relay has been energized holding the relay closed until it is released by pressure on the pushbutton 276. Similar jumpers connect the coils and terminals of the relays 212, 213, 214, 215, 216, 217, 218, 219 and 220.

The relay 212 is energized by the closing due to high pressure of a switch 348 in the nitrogen pressure alarm 66 (FIG. 1). Blades 349, 351, 352, 353, 354, 356 and 357 respectively of the relays 212, 213, 214, 215, 216, 217, 218 are connected through the respective red lamps 301, 302, 303, 304, 305, 306 and 307 with the A.-C. line 208. The normally open terminals associated with these blades are connected to the A.-C. line 207. The relay 213 is energized by the closing due to low pressure of a switch 358 in the nitrogen pressure alarm 66. The relay 214 is energized by closing of a switch 359 operated by the oil level alarm 47 when the oil level rises to a preselected level in the tank 42. The coil of the relay 215 is energized by the closing of a switch 361 operated by the oil level alarm 47 when the oil level drops below a preselected level in the tank 42. The coils of the relays 216 and 217 are respectively connected with the switches 243 and 244 in the left hand device of the unit 94. A normally closed switch, hereinafter to be described, of the relay 228 is in series with the switch 244. The coil of the relay 218 is energized by the closing of the switch 141.

One terminal of the coil of the relay 219 is connected through a blade 362 and its associated normally closed terminal, of the relay 288 with the negative D.-C. line 210 and the other terminal of the coil is connected through the normally open terminal associated with the blade 288 of the relay 219 and the pushbutton 273 with the positive D.-C. line 209, the normally open terminal associated with the blade 274 of the relay 235 and with the contacts 237i of the receptacle 237, and the control 238h of the receptacle 238. The coil of the relay 220 is connected through the switch 364 actuated by the thermostat 49 in the pump room to close when the temperature in the pump room exceeds a preselected level. Blades 366, 367 of the respective relays 219, 220 are connected respectively through the red lamps 308, 309 with the A.-C. line 208. The normally open terminals associated with the blades 366, 367 are connected with the A.-C. line 207.

The coil of the relay 221 is connected between the negative plate of the capacitors 324 and 331 and the negative D.-C. supply line 210. The relay 221 has blades 368, 369, 371 connected as follows: the blade 368 is connected to the positive D.C. line 209, its associated normally open terminal is connected through a resistor 372 which I prefer to have a value of 100 ohms to the negative plate of the capacitors 324 and 331. The blade 369 is connected with the A.-C. line 207 and its associated normally open terminal is connected across a buzzer switch 373 and a buzzer 374 to the A.-C. line 208. The blade 369 has a parallel connection with the terminal block 376 to make provision for a remote bell if desired. The blade 371 is connected with the positive D.-C. line 209 and through its associated normally closed terminal and the resistor 377 and diode 378 with one terminal of the coil of the relay 222. The other terminal of the coil of the relay 222 is connected with the negative D.-C. line 210 across the capacitor 379 for which I prefer a rating of 1500 microfarads. I prefer the resistor 377 to have a value of 27 ohms. In addition to the before mentioned blade 297 the relay 222 has a blade 381 and a blade 382. The three blades of the relay 222 are connected as follows: The blade 297 is connected with the A.-C. line 207 and through its associated normally closed terminal and a white lamp 380 to the A.-C. line 208. The blades 381 and 382 and their associated open and closed terminals are all connected with a terminal block 383. The terminal block 383 provides terminals 387 through which connections can be made to remote alarms.

The receptacle 237 has its contact 237b connected with the positive terminals of the coil of the relay 212 and its contact 237j connected with the positive terminal of the coil of the relay 220. The contact 237a is connected to the A.-C. line 207, the contact 237d is connected with the positive side of the coil of the relay 214 and the contact 237c is connected with the positive side of the coil of the relay 213. The contact 237f is connected with the positive terminal of the coil of the relay 216; the contact 237e is connected with the positive terminal of the coil of the relay 215 and the contact 237g is connected with the positive terminal of the coil of the relay 217. The contact 237k is connected with the A.-C. line 208; the contact 237h is connected with the positive side of the coil of the relay 218 and the contact 237i is connected with the positive side of the coil of the relay 219.

The coil of the relay 223 is connected through the pushbuttons 272 and 253 between the positive D.-C. line 209 and the negative D.-C. line 210. The normally open terminal associated with the blade 256 is connected to the positive side of the coil of the relay 223. The normally closed terminal associated with the blade 257 is connected to the switches 248, 247, 250, 249, 252 and 251 and to a blade 391 of the relay 224. The normally open terminal associated with the blade 257 is connected with the positive side of the coil of the relay 233. A blade 392 of the relay 223 is connected with the A.-C. line 207; its associated normally closed terminal is connected with a blade 393 of the relay 225 and its associated normally open terminal is connected through an amber lamp 394 with the A.-C. line 208 and through a diode or half-wave rectifier 395 with the lamp test line 310. Diode as used in this application is understood to refer to half-wave rectifiers which may be any of a plurality of known types of such rectifiers.

The coil of the relay 224 is connected with the switch 248 and 314 on one side and the negative D.-C. line 210 on the other. Two of the blades of the relay 224 are utilized. The aforementioned blade 391 is connected through its associated normally open terminal to a blade 397 of the relay 225. A blade 398 is connected with the switch 247 and through its associated normally open terminal to the positive side of the coil of the relay 224. The relay 225 has its coil connected between the pushbutton 268 and through the resistor 254 to a normally open terminal of the pushbutton 253 on one side and to a normally closed terminal of the pushbutton 253 on the other. Of the three blades 271, 397 and 393 of the relay 225 the blade 271 is connected to the pushbutton 268 and to the terminal 269 of the relay 223; its associated normally closed terminal 266 is connected with the blade 263 of the relay 226 and the blade 264 of the relay 227 and, through the pushbutton 262, with the coil of the relay 227; and its normally open terminal with the coil of the relay 234 and through a diode 399 to the positive side of the coil of the relay 225. The blade 397 is connected with the normally open terminal associated with the blade 391 of the relay 224 and its associated normally open terminal is connected with the coil of the relay 233. The blade 393 is connected with the normally closed terminal associated with the blade 392 of the relay 223, its associated normally closed terminal is connected with a blade 401 of the relay 227 and its associated normally open terminal is connected with the A.-C. line 208 through the amber lamp 402 and, through the diode 403 to the lamp test line 310.

The coil of the relay 226 is connected with the switch 250 on one side and with the normally open terminal associated with the blade 406 of the relay 227, and with the coil of the relay 231 on the other. Two of the switches of this relay are utilized. These are the switches having the blade 263 and a switch having a blade 404 connected with the blade 249 and having a normally open associated terminal connected to the positive side of the coil of the relay 226. A normally open terminal associated with the blade 263 is connected with the positive side of the coil of the relay 233. The coil of the relay 227 is connected on one side to the pushbutton 262 and on the other to the normally open terminal associated with the blade 414 of the relay 228. Of the blades of the relay 227 the blade 264 is connected with the pushbutton 262 and through its associated normally open terminal with the normally closed terminal associated with a blade 407 of the relay 229 and to the positive terminal of the coil 227. The blade 406 is connected through its associated normally open terminal with the negative side of the coils of the relays 226 and 231; and the blade 401 is connected through its associated normally closed terminal with the lamp 408 and through the diode 409 to the lamp test line 310. Through its associated normally open terminal the blade 401 is connected with the lamp 405 and with the diode 411 which, in turn, is connected with the lamp test line 310.

The coil of the relay 228 is connected on one side with the pushbutton 258 and the resistor 261 and on the other side with the blade 407 of the relay 229 and with the contact 238a of the receptacle 238. The blade 362 is connected through its associated normally open terminal to the coil of the relay 228. A blade 413 of the relay 228 is connected through the switch 244 with the positive D.-C. line 209; its associated normally closed terminal is connected to the coil of the relay 217, and its associated normally open terminal is connected with the blade 415 of the relay 229. A blade 414 of the relay 228 is connected with the negative D.-C. line 210 through the normally closed switch of the pushbutton 253; its associated normally closed terminal is connected with the positive terminal of the coil of the relay 235 and its associated normally open terminal is connected with the coil of the relay 227.

The coil of the relay 229 is connected on one side through the switch 246 with the D.-C. positive line 209 and to the normally open terminal associated with the blade 415 of the relay 229, and also to the normally closed terminal associated with the contact 238e of the receptacle 238, and on the other side with the D.-C. negative line 210. Of the blades of the relay 229 the blade 407 is connected as hereinbefore described, a blade 417 is connected through the switch 142 of the motor starter 133 (FIG. 3) with the A.-C. line 203. The normally open terminal associated with the blade 417 is connected through the coil of the magnetic valve 79 with ground.

The relay 230 is a spare relay for which a receptacle is provided having no connected wiring.

The positive terminal of the coil of the relay 231 is connected to the switch 252 and the contact 238f of the receptacle 238 and the negative terminal is connected to the normally open terminal associated with the blade 406 of the relay 227. Two of the blades of the relay 231 are operative. A blade 418 is connected with the switch 251 and through its associated normally open terminal to the coil of the relay 231; and a blade 419 is connected with the A.-C. line 203. The normally open terminal associated with the blade 419 is connected through the coil of the magnetic valve 91 with ground.

The coil of the relay 232 is connected between the negative D.-C. line 210 on one side and the switch 242 and the contact 238g of the receptacle 238 on the other. A blade 421 of the relay 232 is connected with the switch 241 and its associated normally open terminal is connected to the coil of the relay 232. A blade 422 of the relay 232 is connected with the A.-C. line 203 and the blade 419 of the relay 231 and the normally open terminal associated with the blade 422 is connected through the coil of the magnetic valve 91 to ground.

The coil of the relay 233 is connected between the negative D.-C. line 210 and the normally open terminals associated with the blades 257, 397 and 263 respectively of the relays 223, 225 and 226. A blade 423 of the relay 233 is connected with the A.-C. line 207; its associated normally closed terminal is connected through a green lamp 424 with the A.-C. line 208 and through a diode 426 to the lamp-test line 310, and its associated normally open terminal is connected through a green lamp 427 with the A.-C. line 208 and through a diode 428 with the lamp-test line 310. A blade 429 of the relay 233 is connected to the A.-C. line 203. The associated normally open terminal of the blade 429 is connected through the coil 134 and overload switches 136 of the motor starter 133 (FIG. 3) with ground. A blade 431 of the relay 233 is connected with the A.-C. line 203. The normally open terminal associated with the blade 431 is connected to the blade 319 of the relay 234.

The relay 234 is connected between the negative D.-C. line 210 and the normally open terminal associated with the blade 271 of the relay 225. The blade 318 of the relay 234 is connected with the D.-C. line 203, and its associated normally open terminal is connected with the motor 312 of the timer 311. The blade 319 of the relay 234 is connected through its associated normally open terminal to the solenoid 313 of the timer 311.

The coil of the relay 235 is connected between the normally closed terminal associated with the blade 414 of the relay 228 on one side; and the switch 245, the normally open terminal associated with the blade 274 of the relay 235, and the contact 238h of the receptacle 238, on the other. The blade 274 of the relay 235 is connected as has been hereinbefore described. A blade 433 of the relay 235 is connected with the A.-C. line 203 and through its associated normally open terminal and through the coil of the magnetic valve 33 (FIG. 1) with the grounded line 204. A blade 434 of the relay 235 is connected through an amber lamp 436 to the A.-C. line 208. The normally closed terminal associated with the blade 434 is connected through the diode 435 to the lamp-test line 310. The normally open terminal associated with the blade 434 is connected with the A.-C. line 207.

The coil of the relay 236 is connected between the negative D.-C. line 210 on one side and, on the other side, through jumpers 436, 437, 438, 439 and 441 in plug-in type connectors hereinafter to be described, to the positive D.-C. line 209, and parallel to the said jumpers to the contact 238i of the receptacle 238. The blade 442 of the relay 236 is connected through a capacitor 443 which I prefer to have a value of 300 microfarads and a resistor 444 which I prefer to have a value of 27 ohms to the normally closed terminal associated with the blade 442. The resistor 444 and the capacitor 443 in parallel are connected with the positive terminal of the coil of the relay 225. The normally open terminal associated with the blade 442 is connected with the positive D.-C. line 209. A blade 446 of the relay 236 is connected through the red lamp 436 to the A.-C. line 208 and through the diode 445 to the lamp-test line 310. Through its associated normally closed terminal the blade 446 is connected to the A.-C. line 207.

The contact 238b of the receptacle 238 is connected with the positive side of the coil of the relay 223, and the contact 238j is connected with the positive side of the coil of the relay 222. The contact 238a is connected with the positive D.-C. line 209; the contact 238d is connected with the positive side of the coil of the relay 226, and the contact 238c is connected with the positive terminal of the relay 224. The contact 238f is connected with the positive side of the coil of the relay 231; the contact 238e is connected to the positive side of the coil of the relay 229 and the contact 238g is connected with the positive side of the coil of the relay 232. The contact 238k is connected with the negative D.-C. line 210; the contact 238h is connected with the positive side of the coil of the relay 235 and the contact 238i is connected with the positive side of the coil of the relay 236.

A green lamp 447 is connected between the A.-C. lines 208 and 207 and through a diode 449 to the lamp-test line 310.

It is a feature of my invention that the relays 211–236 are connected with the operating elements of the controls and with the external apparatus through plug-in type connectors, each comprising a receptacle and plug. Referring to FIG. 6 a relay panel 448 includes plug-in type receptacles 451, 452, 453, 454, 456, 457 and 458 and their respective mating plugs 459, 461, 462, 463, 464, 466 and 467. The plug-in connectors 451 to 458 are of known types and are available from commercial sources.

The receptacle 451 and the plug 459 together constitute a 15-point connector. The plug 459 is connected to an alarm panel 468 by a cable 469. The panel 468 comprises the lamps 299, 301, 302, 303, 304, 305, 306, 307, 308 and 309. The receptacle 452 and the plug 461 together constitute a 27-point connector, the plug 461 being connected by a cable 471 to a control panel 472 which comprises the push-buttons 276, 291, 272, 268, 262, 253, 273, and 258 and the lamps 380, 385, 394, 402, 405, 408, 436, 259, 343, 345, 424, 427, 447 and 396 (FIGS. 4a, 4b). The receptacle 53 and the plug 462 together constitute a 24-point connector. The plug 462 is connected through a cable 473 to a terminal block 474, which is, in turn wired to apparatus comprising the oil level indicator alarm 47, the pump-room thermostat 49, the nitrogen pressure switch 66. The terminal block 474 also provides 8 terminals 476 which may be connected to remote alarms if desired.

The receptacle 454 and the plug 463 together constitute a 6-point connector. The plug 463 is connected through a cable 477 to a terminal block 478 which is, in turn, wired to the normally open magnetic relief valve 79, the normally closed magnetic valve 91 to the A.-C. power line 336 (FIG. 3) and to the grounding wire (or insulated neutral) 204. It will be understood that although I prefer to terminate the cables 473 and 477 in the respective terminal blocks 474 and 478 I do not wish to be limited to this construction and other methods of connecting the plugs 473, 477 to their control elements either directly or indirectly may be used.

The receptacle 456 and the plug 464 together constitute an 8-point connector, the plug 464 being connected through a cable 479 to the terminals of the timer 311.

The receptacle 457 and the plug 466 together constitute a ten-point connector. The plug 466 is connected through a cable 481 to a panel 482 comprising the switches 122 and 126 of the relay 119 (FIG. 2), the coil 134 of the motor starter 133, and the auxiliary switches 141, 142 of the starter 133 (FIG. 3).

The receptacle 458 and the plug 467 together constitute a 21-point connector. The plug 467 is connected through a cable 483 to the panel 484 for the recorder 94 comprising the switches 241, 242, 243, 244, 245, 246, 247, 248, 249, 250, 251 and 252 and the chart drive 340.

The jumper 436 in the plug 459 is connected between two points 486 and 487 in the connector. Point 487 of the receptacle 451 is connected by means of a wire 488 in the panel 448 to a point 489 in the receptacle 453. The point 489 is connected by means of the jumper 437 in the plug 462 to a point 491 in the connector comprising the plug 462 and the receptacle 453. The point 491 is connected by means of a wire 492 in the panel 448 to a point 493 in the receptacle 456. The point 493 is connected by means of the jumper 438 in the plug 464 to a point 494 in the plug 464. The point 494 is connected by means of a wire 496 in the panel 448 to a point 497 in the receptacle 457. The point 497 is connected by means of the jumper 439 in the plug 466 to a point 498 in the plug 466. The point 498 is connected by means of a wire 499 in the panel 448 to a point 501 in the receptacle 458. The point 501 is connected through the jumper 441 in the plug 467 to a point 502 in the plug 467. The jumpers 436, 437, 438, 439, 441 and panel wires 488, 492, 496, 499 are thus seen to form a series connection between the point 486 and the point 502 which will be interrupted by the separation of any one or more of the plugs 459, 462, 464, 466, or 467 from its mating receptacle.

I have hereinbefore indicated that I prefer to use standard plug-in type 3-pole, double-throw relays for the relay panel of my controller 11. I have found that although a plurality of said relays do not require the use of all the terminals of the 3-pole, double-throw type the advantages of standardization outweigh any hypothetical economy that might be achieved by using simpler types of relays where they would suffice. One advantage, which will be immediately apparent, is that the spare relay 230 may be quickly substituted for any of the other relays that malfunctions or becomes damaged. I have preferred to use 11-pin relays having 5-ampere contacts and a 24 volt D.-C. 475 ohm coil such as the relays made by the Line Electric Company and sold under their number MKP 3D34. The operation of the said relays is independent of the polarity of the coil connections.

I have provided two 11-point test receptacles 237 and 238. The receptacles 237 and 238 are not intended for the insertion of relays but for the insertion respectively of an 11-point jack 601 having pins 601a–601k and an 11-point jack 602 having pins 602a–602k (FIGS. 7 and 8), said jacks comprising part of a test unit designated generally as 603. The jacks 601 and 602 are connected to the test unit 603 by their respective cables 604 and 606. The cables 604 and 606 enter a housing 607 upon which are mounted a D.-C. voltmeter 608 and its associated push-button 609, an A.-C. voltmeter 611 and its associated push-button 612, a relay test receptacle 613 having contacts 613a–613k, and its associated push-button 614, red lamps 616, 617, 618 and green lamps 619, 621, 622. Also mounted on the housing 607 are a plurality of push-buttons 623, 624, 626, 627, 628, 629, 631, 632, 633, 634, 636, 637, 638, 639, 641, 642, 643, each having one terminal connected through the cable 606 to the pin 602a of the jack 602. The remaining terminals of the push-button are connected to the pins of the jacks 601 and 602 as follows: 623 is connected to 601b; 624 is connected to 601c; 626 is connected to 601d; 627 is connected to 601e; 628 is connected to 601f; 629 is connected to 601g; 631 is connected to 601h; 632 is connected to 601i; 633 is connected to 601j; 634 is connected to 602b; 636 is connected to 602d; 638 is connected to 602e; 639 is connected to 602f; 641 is connected to 602g; 642 is connected to 602h; 643 is connected to 602i. The pushbutton 609 is connected between the pin 602a and the D.-C. voltmeter 608 and thence to the pin 602k. The pushbutton 612 has one terminal connected to the pin 601a and also to the contacts 613a, 613k and 613f and the other terminal connected through the A.-C. voltmeter 611 to the pin 601k and each of the lamps 616, 617, 618, 619, 621 and 622.

The relay test push-button 614 is connected between the pin 602a and the contact 613b. Each of the lamps is connected to a contact of the test receptacle 613 as follows: 616 is connected to 613d; 617 is connected to 613e; 618 is connected to 613h; 619 is connected to 613c; 621 is connected to 613g; 622 is connected to 613i.

The jack 602 plugs into the receptacle 238, each of the pins of the jack fitting into a like lettered contact of the receptacle. Similarly the jack 601 plugs into the receptacle 237, each of the pins again fitting into the contact having the same letter designation. The relays 212–236, being identical, will each fit the receptacle 613 in such a manner that when a relay is inserted the contacts 613b and 613j will be across the coil, 613a will contact one blade, 613c will contact the normally open terminal associated with the blade contacted by 613a, and 613d will contact the normally closed terminal associated with said blade. The contact 613f will connect to another of the blades of the relay, 613g to the normally open terminal associated with said blade and 613e to the normally closed terminal associated with said blade. The contact 613k will connect with the third blade of the relay, 613i with the normally open terminal associated with said blade and 613h with the normally closed terminal associated with said blade.

*Operation*

To introduce oil into a newly installed pipe-type cable the entire system is first flushed out with dry nitrogen. A vacuum pump may then be connected to the system by means of the normally closed manual valve 701 (FIG. 1). I prefer to evacuate the entire system to a pressure of 1 mm. or less of mercury and to search out and repair any leaks until the system will show an increase of pressure less than 1 mm. of mercury in one hour. Oil is then introduced into the system while still maintaining vacuum at the valve 701 until oil passes through the valve. The oil storage tank 42 has a volume adequate for the volume fluctuations of the system in operation but insufficient to fill the system initially. I have therefore provided a normally closed manual auxiliary filling valve 702 through which the system can be filled directly from tank trucks. During the filling the pump 13 may be by-passed. If the pump 13 is operated to fill the pipe-type cable the controls may be set for manual or reduced pressure operation during the filling operation. During reduced pressure operation the pump will stop when the pressure reaches a value which I prefer to set at 65 p.s.i.g.

With the system still under vacuum and the valves 41 and 46 open, oil will enter the oil storage tank 42. When a sufficient supply of oil has entered the tank 42 leaving enough volume in the tank to accommodate the oil that will be forced from the pipe-type cable when the latter is energized with a consequent increase in temperature the valve 46 (and 46a for a 2-controller system) is closed and the remainder of the tank 42 filled with dry nitrogen from the cylinder 50.

The system having been filled with oil the valves 701 and 702 are closed, the valve 46 (and 46a) opened and the system maintained at reduced pressure until the cable system is ready to be tested and/or energized. When the system is ready to go from reduced pressure onto normal pressure operation it is only necessary to depress the "normal pressure" push-button 268 (FIG. 5a) momentarily energizing the coil of the relay 225. Energizing of the coil of the relay 225 will move the blade 271 to its normally open terminal and continue to feed current to the coil so long as the blade 256 of the relay 223 is in its normally closed position. If, however, the "manual" push-button 272 has been depressed and the relay 223 is locked in its energized position no current will feed into the blade 271. In this situation it is first necessary to depress the "off" push-button 253 and open the circuit supplying current to the blade 256 of the relay 223 so as to deenergize the coil of that relay. When the system is in "normal" condition with the relay 225 energized, the blade 393 will have closed the circuit to light the amber lamp 402. Consider the case where the system is in normal operation there is adequate pressure in the pipe-type cable and the pump is not running. The coil 134 (FIGS. 3 and 5b) of the motor starter 133 will be deenergized. When, because of a decrease in the ambient temperature or in the load in the cable the oil cools somewhat and the pressure in the piping 96 (FIG. 1) drops below 200 p.s.i.g. the switch 246 in the unit 94 will close energizing the coil of the relay 229 whereby the blade 417 will move to its normally open terminal and close the magnetic relief valve 79 so long as the pump is inoperative. When the coil 134 for the motor starter 133 is energized the auxiliary switch 142 will open the circuit through the magnetic valve 79. Closing of the valve 79 will prevent any oil from leaving the pipe-type cable and returning to the storage tank 42. As cooling continues and the pressure in the line 96 drops to 180 p.s.i.g. the switch 248 will close and energize the coil of the relay 224 (so long as the relay 223 which is responsive to the "manual" push-button 272 is in its deenergized position). Under these conditions the switch 247 which closes at a pressure of 210 p.s.i.g. will be closed locking the relay until the pressure rises above 210 p.s.i.g. With the coil of the relay 224 energized the blade 391 will be in contact with its normally open terminal and current will pass from the positive D.-C. line 209 through the push-button 253, the blade 257 of the relay 223, the blade 391, the blade 397 of the relay 225 which is energized when the system is at "normal pressure" operation, to energize the coil of the relay 233 thus moving the blade 429 to close the circuit through the motor starter coil 134, starting the pump 13. At the same time the blade 423 will move to extinguish the green lamp 424 and light the green lamp 427.

During normal pressure operation the coil of the relay 234 will be energized through the blade 271 of the relay 225. The blades 318 and 319 of the relay 234 will be in contact with their respective normally open terminals in the circuits supplying current to the motor 312 and solenoid 313 of the timer 311.

The blade 318 is connected to the A.-C. line 203 so that when the system is in "normal pressure" operation resulting in the relay 234 being energized the clock motor 312 of the timer 311 will be in operation. The blade 319 is connected to the normally open terminal of the blade 431 of the relay 233 so that when the pump starts during normal operation the solenoid 313 will start a time cycle. Since the relay 234 is not energized during manual and reduced pressure operation the timer will not start under those conditions even though the pump is activated. As has been hereinbefore stated, when a time cycle starts the switch 314 will close for a period (typically 5 minutes) sufficient for pressure to reach the remote end of the pipe-type cable. The switch 314 bypasses the switch 248 energizing the coil of the relay 224 for a five-minute period even though the switch 247 should open due to the pressure in the piping 96 exceeding a value of 210 p.s.i.g. Adequate pressure is thus assured throughout the entire length of the system. At the termination of a period which I prefer shall be ½ minute after the reopening of the switch 314 the timer 311 will automatically close the switch 317 in the primary circuit of the transformer-rectifier 321 (FIG. 4b). If, at or during the time the switch 317 is closed, both the relays 233 and 234 are energized (indicating that the pump is operating under normal pressure conditions) and the auxiliary switch 141 (FIG. 3) of the motor starter 133 is closed the transformer-rectifier 321 will energize the relay 218, lighting the red lamp 307 through the blade 357 and through the blade 355 energizing the coil of the relay 221 (FIG. 4b) which closes the circuits to optional remote alarms connected to the terminal block 383. Since the switch 317 of the timer 311 will remain closed for a chosen period such as 4½ minutes starting of the pump due to loss of pressure during this period will cause an excessive cycling signal. By this means I am able to give an alarm for slow leaks which are not sufficient to cause a drop in pressure exceeding the capacity of the pump. The timer 311 can be reset manually at any time during any part of its cycle by depressing the "off" push-button 253 followed by depressing the "normal pressure" push-button 268. Since an alarm will be given if the pump is operating under "normal operation" condition at the same time as the timer switch 317 is closed, my method of wiring will provide a warning for both the case where the pump requires excessive time to bring the system up to pressure, and the case where the pump restarts too soon after having brought the system to pressure. This latter warning will be given by virtue of the fact, heretofore noted, that the switch 317 will remain closed for 60 minutes from the time the pump is started.

Should the pressure drop to 160 p.s.i.g. in the line 96 the switch 244 will close connecting the blade 413 of the relay 228 with the positive D.-C. line 209. If the system is operating at reduced pressure the coil of the relay 228 will be energized and the blade 413 will be in electrical connection with the blade 415 of the relay 229 and closure of the switch 244 will have no effect except as a second source of current to keep the coil of the relay 229 energized. Under "normal pressure" operation, however, the relay 228 will be deenergized and the blade 413 will be connected with the coil of the relay 217. Closing of the switch 244 under "normal pressure" conditions will thus energize the relay 217, lighting the red lamp 306 by means of the blade 356 and energizing the coil of the relay 221 by means of the blade 334 and capacitor 331. The relay 221 will sound a buzzer 374 and energize the terminal block 376 which may be connected with a remote bell or bells and will also deenergize the coil of the relay 222 lighting the white lamps 380 and, by means of the blades 381 and 382, activating the remote alarms connected to the terminal block 383.

When, instead of a loss of pressure, the pressure in the pipe-type cable rises due to an increase in temperature at a time when the system is in "normal pressure" operation the valve 79 will open due to opening of the switch 246 and the relay 229 when the pressure reaches 200 p.s.i.g.; the pump will stop due to opening the switch 247 and deenergizing the relays 224 and 233 when the pressure reaches 210 p.s.i.g. provided it has not been stopped already by the timer 311. When the pressure rises to 225 p.s.i.g. the mechanical relief valve 81 will open and oil will then flow back into the tank 42 through the pipe 14, valve 16, cross coupling 18, valve 17, T 24, union 22, valve 27, pipe 26, T's 23, 74, 76, 77, strainer 78, valves 79, 81 and 82, T's 83, 84, 86, valve 87, union 21, pipe 38, valve 41, T 43 and the valve 46. When the pressure reaches 250 p.s.i.g. the valve 88 will open providing a parallel return through the valve 89 and the switch 241 will close. At 260 p.s.i.g. the switch 243 (FIG. 4a)

will close energizing the coil of the relay 216 which will light the red lamp 305 and through the relays 221 and 222 as hereinbefore described, sound the buzzer 374 and the remote alarms and light the lamp 380. If the pressure continues to rise to 300 p.s.i.g. the switch 242 will close, energizing the coil of the relay 232 which will remain energized until the switch 241 opens again at 250 p.s.i.g. The relay 232 will open the valve 91 by means of the blade 422. This will provide another parallel oil channel through the check valve 92 and valve 93 for the return of oil to the tank 42. Finally the safety valve 95 in the pump 13 will relieve at 375 p.s.i.g., and should the reservoir 42 start to build up pressure, a safety disk 703 therein will rupture at a pressure of 60 p.s.i.g.

A feature accounting in part for the close limits within which I am able to maintain the oil pressure on a pipe-type cable system resides in the relationship of the valves 81, 79 and 88 of which, as has been described heretofore, the valve 81 is a mechanical valve which opens into the valve 82 when the pressure behind it exceeds 225 p.s.i.g., the valve 88 is a mechanical valve which opens into the valve 89 when the pressure behind it exceeds 250 p.s.i.g. and the valve 79 is a magnetic valve operated by means of the switch 246 and the relay 229 to close when the pressure drops below 200 p.si.g. Of the manual valves 90, 82 and 89 the valves 82 and 89 are normally open and the valve 90 is normally closed. Under "normal pressure" operation no oil will pass through the valve system comprising the valves 81, 79 and 88 until the pressure has built up to 225 p.s.i.g. At this point the valve 81 will open relieving the pressure in the line in a manner that has already been described. Since oil is practically an incompressible medium the pressure will drop very quickly when the valve 81 opens and I have found that although, ideally, the valve 81 should close again as soon as the pressure drops below 225 p.s.i.g. actual commercial mechanical relief valves have a considerable time lag before they seat properly. I have found this particularly to be the case when there was a considerable flow of oil through them.

In the instant case, however, as soon as the pressure drops to 200 p.s.i.g. the magnetic valve 79 closes and permits the mechanical valve 81 to lock into place. The valve 88 provides a safety relief which will open in the event of malfunctioning that closes the valve 79 or fails to open the valve 81 even at elevated pressure.

In the event that the temperature should rise excessively in the pump room the switch 364 in the thermostat 49 (FIG. 1 will close, energizing the coil of the relay 220 and lighting the red lamp 309. A high-low control 47 on the reservoir 42 comprises the switches 359 and 361. Should the oil level drop too low the switch 361 will close energizing the relay 215 to light the red lamp 304 and energize the relay 221 to light the white lamp 380 and sound the buzzer 374 and the remote alarms. A high oil level will act similarly through the switch 359 and the relay 214 except that it will light the red lamp 303. The nitrogen control 66 has switches 348 and 358. Should the pressure drop below a selected value such as 2 p.s.i.g. the switch 358 will close and energize the coil of the relay 213 lighting the red lamp 302. Should the pressure rise above some value such as 10 p.s.i.g., the switch 348 will close to energize the relay 212 and light the red lamp 301. In either event the relay 221 will be energized, lighting the white lamp 380 and sounding the buzzer 374 and the remote alarms.

I prefer to have two independent 3-phase sources of power supply, a normal supply 111 (FIG. 2) and an emergency supply 112. The power transfer switches 114 and 117 for these sources are mechanically interlocked by a mechanism 115 of known construction for which I make no claim of invention. The mechanism 115 is so constructed that either or both of the circuit breakers 114 and 117 may be open simultaneously; either the circuit breaker 114 or the circuit breaker 117 may be closed; but both the circuit breakers 114 and 117 cannot be closed simultaneously. If there is power in the normal supply 111 current will flow from the phases 127 and 128 to energize the coil 121 of the relay 119 closing the switches 124 and 126 and opening the switches 122 and 123. With the switch 124 closed the relay 116 will be energized to close the switch 114 supplying current to the lines 113. In the event of failure of the normal source 111 the coil 121 will be deenergized and the switches 124 and 126 will open and the switches 122 and 123 will close. Closing of the switch 123 will energize the coil 118 of the circuit breaker 117 from the phases 131 and 132 thus closing the switch 117 to supply the power lines 113. Return of power to the source 111 will energize the coil 121 thus closing the switch 114. Due to the mechanized interlock 115 the switch 117 will then open.

When, due to loss of power at the source 111 the switch 122 closes and energizes the coil of the relay 211 (FIG. 4a), note that in FIG. 4a the relay 211 is deenergized even though the switch 122 is closed. This is due to the fact that the condition of the system in the drawings is one where the entire system is deenergized. The relay 211 will light the red lamps 299 and 343 and energize the coil of the relay 221 to sound the buzzer and give the remote alarms. Each of the alarm relays 211, 212, 213, 214, 215, 216, 217 and 218 locks in its closed position by means of current received through the right hand contact of the "signal reset" pushbutton 276 and will be deenergized when the pushbutton 276 is depressed. Depression of the pushbutton 276 will also, through its left hand contact, discharge the capacitors 324 and 331 and deenergize the relay 221. It is a feature of my invention that the coil of the relay 222 is connected in parallel with the capacitor 379 and in series with the resistor 377. Due to a finite length of time, which is about 5 seconds using my preferred components, required to discharge the capacitor, the relay 222 will remain energized during momentary current interruptions and will not give a remote alarm. If this delay feature were omitted from my invention a trouble-shooter might journey a considerable distance to the controller from a remote alarm station unnecessarily.

When the system utilizes both the controllers 11 and 11a I have found that it is convenient to have the normal power supply 111 for the controller 11 constitute the emergency power supply for the controller 11a and to have the emergency power supply 112 for the controller 11 constitute the normal power supply for the controller 11a. In this manner both power sources will be utilized during normal operation and will be kept under the surveillance of the alarm system and yet the system will have the safeguard of a secondary power source. When two controllers are utilized either pump can be made to supply pressure for the alternate side of the system by means of the normally closed magnetic crossover valves 33 and 34. Consider the controller 11 with the understanding that an analogous discussion will apply to the controller 11a. Should the pressure in the system, as reflected by the pressure in the piping 96, drop to 150 p.s.i.g. the switch 245 in the recorder 94 will close, energizing the coil of the relay 235 to light the amber lamp 436 and open the magnetic valve 33. With the valve 33 open oil will flow from the union 23a through the valves 37, 33, 31 and 36 into the low pressure system. When the pressure in the piping 102a is reduced to 180 p.s.i.g. the pump 13a will start in a manner analogous to that hereinbefore described for starting the pump 13. In order for the relay 235 to remain energized current must be supplied to the line connected to the normally open terminal associated with the blade 274. Such current will be received through the blade 288 of the relay 219 when that relay is energized. The relay 219 is energized at the same time as the relay 235 when the switch 245 closes provided the relay 228 which is energized during "reduced pressure" operation is in the deenergized condition with its blade 362 in its normally closed position. This interlock of relays prevents oil from draining from the controller 11a to the controller 11 when the latter is operating at reduced pressure. When the relay 219 is energized by closure of the switch 245 the red lamp 308 will be lighted by means of the blade 366.

When there is a leak in the pipe-type cable system sufficiently large to require deenergization of the cable system it is desirable to reduce the oil pressure in the system to reduce oil losses through the leak. The pressure in the line can be reduced by depressing the "off" pushbutton 253, and then simultaneously depressing the "reduced pressure interlock" pushbutton 258 and the "reduced pressure" pushbutton 262. This required sequence provides a safety measure so that only a person who is familiar with the proper sequence will be capable of putting the pump on "reduced pressure." Depressing the "off" pushbutton 253 when the system is operating at "normal" pressure will break the circuit to the coil of the relay 225 which has hereinbefore been shown to control the "normal pressure" operation in response to the pushbutton 268. As a further precaution, when the "off" pushbutton 253 is depressed the positive terminal of the coil of the relay 225 is connected through the resistor 254 to the negative D.-C. line 210. Subsequent depression of the "reduced pressure interlock" pushbutton 258 will close the circuit to the coil of the relay 228 provided the relay 229 is energized which will be the case whenever the pressure has dropped to 200 p.s.i.g. due to the action of the switch 246 as hereinbefore described. Should the relay 229 be deenergized, the circuit to the coil of the relay 228 instead of passing to the blade 407 directly from the positive D.-C. line 209 will follow the circuit formed by the blade 407, the normally open terminal associated with the blade 264 of the relay 227, the pushbutton 262, the terminal 266 and blade 271 of the relay 225, the terminal 269 and blade 256 of the relay 223, a normally closed contact of the pushbutton 253 and the D.-C. line 209. Simultaneous depression of the pushbuttons 258 and 262 will have energized the coil of the relay 227 which through the means of the blade 406 will energize the coil of the relay 231 and open the magnetic relief valve 91 (FIGS. 1 and 5b) by means of the blade 419.

With the valve 91 open the oil pressure will quickly drop to 200 p.s.i.g. at which point the valve 91 will close, as hereinbefore described, to energize the relay 229 and connect the blade 407 directly to the D.C. line 209. While the system is operating at reduced pressure the coil of the relay 233 controlling the pump motor will be in the circuit including the blade 263 of the relay 226 which will start the pump when the pressure drops to 45 p.s.i.g. closing the switch 250 and stop the pump when the pressure increases to 65 p.s.i.g. Once the system is operating regularly at reduced pressure the valve 91 will close under the influence of the switch 251 acting through the relay 231 when the pressure drops to 60 p.s.i.g. and remain closed, unless for some reason such as an increase in oil temperature, the pressure should rise to 75 p.s.i.g. under which circumstance the switch 252 would close and energize the coil of the relay 231. While the controller 11 is operating under reduced pressure the blade 414 of the relay 228 will open the circuit to the coil of the relay 235 controlling the valve 33 thus assuring that the valve 33 will remain closed and not drain oil from the controller 11a. The blade 413 of the relay 228 will also have opened the circuit of the coil to the relay 217 so that no remote alarm will be given due to closing of the oil pressure alarm switch 244.

As a safety measure preventing the inadvertent return to normal pressure I have provided that it shall be necessary to push the "manual" pushbutton 272 to return the system from reduced pressure to normal pressure operation. The "manual" pushbutton 272 operates as follows: Depression of the "manual" pushbutton 272 energizes the coil of the relay 223 which automatically "locks in" by means of the blade 256. With the relay 223 energized the normal pressure pushbutton 268 and the "reduced pressure" pushbutton 262 will be inoperative since they are in a series circuit with the normally closed terminal 269 of the blade 256. The switches 248, 247, 250, 249, 252, 251 are all connected through the normally closed terminal associated with the blade 257 to the line 209 and are inoperative when the blade 257 is connected to its normally open terminal. When the relay 223 is energized the blade 257 will connect with the coil of the relay 233 starting the pump 13. Movement of the blade 392 when the relay 223 is energized serves to extinguish the red lamp 408 and light the amber lamp 394. With the pump 13 operating under manual control the pressure will build up to 200 p.s.i.g. at which point the switch 246 will open and de-energize the relay 229. The blade 407 will then move to its normally closed position but with the blade in this position the circuit to the coil of the relay 228 will be still open because this circuit includes the blade 256 and terminal 269 of the relay 223.

It is a feature of my invention that the lamps can all be tested at once by the simple depression of a pushbutton without interrupting normal operation or setting off any false alarms. For this purpose I have provided a "lamp test" pushbutton 291 connected to the A.-C. line 207. The lamps 299, 301, 302, 303, 304, 305, 306, 307, 308, 309 are each connected to a blade of a relay each of which blade has one associated terminal connected with the "lamp test" pushbutton 291 and its other associated terminal connected directly to the A.-C. supply. Thus when the pushbutton 291 is depressed all the above mentioned lamps should be lit either directly or through the pushbutton. The remainder of the panel lamps with the exception of the red lamp 259 are connected through individual diodes that prevent the A.-C. current, used to supply any one lamp during normal operation, from lighting any of the others through the test circuit. The red lamp 259 is connected through the pushbutton 291 between the negative D.-C. line 210 and the positive D.-C. line 209.

It is an advantage of my invention that the lamps associated with my control circuit, such as the lamp 394, can be tested by the depression of the pushbutton 291 but are not affected by the current feeding into other lamps on the same circuit. In the case of the lamp 394, for example, the lamp 402 might be lighted by the energizing of the relay 225 whereby the blade 393 would close the circuit comprising the A.-C. line 207, the blade 392 of the relay 223, the blade 393 of the relay 225, the lamp 402 and the A.-C. line 208, without lighting the lamp 394 because of the diodes 395 and 403.

I have provided that in the event of a complete power outage involving both the normal and emergency power sources the system will automatically return to "normal pressure" operation when power is restored provided it was operating at "normal pressure" at the time of the power interruption. I accomplish this objective in the following manner: The positive terminal of the coil of the relay 225 is connected to one plate of the capacitor 243. When power is resumed the relay 236 is energized and the blade 442 becomes connected to the positive D.-C. line. Current can then pass through the coil of the relay 225 to charge the condenser 443 thereby energizing the coil 225 in a manner analogous to depressing the "normal pressure" pushbutton 268.

An important novel feature of my invention is provided by the test receptacles 237 and 238 and the test unit 607 (FIGS. 7 and 8). The method of operating this unit is as follows: The jack 601 is inserted in the receptacle 237 and the jack 602 is inserted in the receptacle 238. The test button 612 is then depressed with the result that the A.-C. voltmeter 611 will indicate the voltage across the low voltage A.-C. lines 207 and 208. The test button 609 is then depressed to indicate on the D.-C. voltmeter 608 the voltage across the D.-C. lines 209 and 210.

When the jack 602 is inserted in the receptacle 238 the jumper 605 serves to short the positive lead to the coil of the relay 222 to the positive line 209 thus keeping the relay 222 energized and preventing a remote alarm while the relays are undergoing test.

With the jacks 601 and 602 inserted, depression of the pushbutton 623 will energize the coil to the relay 212 and, if said relay and its associated circuit is operating properly, light the lamp 301. The relay 212 should then be deenergized by depressing the "signal reset" pushbutton 276. Similarly, depression of the pushbuttons 624, 626, 627, 628, 629, 631, 632 and 633 will test the relays 213, 214, 215, 216, 217, 218, 219 and 220 and their associated circuits, by respectively lighting the lamps 302, 303, 304, 305, 306, 307, 308 and 309. The relay 223 and its associated circuit is tested by depressing the pushbutton 634 to light the lamp 394. To test the relays 224 and 225 and their associated circuitry, the pushbutton 268 is first depressed, following which, depression of the pushbutton 636 will start the pump motor. The relays 226, 227 and 228 and their associated circuits are tested by depressing the "reduced pressure interlock" pushbutton 258 and the "reduced pressure" pushbutton 262 following which, depression of the pushbutton 637 will start the motor. It will be understood that in testing the relays 223, 224, 225, 226, 227 and 228 it is first necessary to depress the "off" pushbutton 253 to clear the controls. Prior to testing the relays 226 or 231 the valve 17 should be closed to prevent loss of pressure in the system while the cable is energized. The relay 229 and the valve 79 and their associated circuitry are tested by depressing the pushbutton 638 which has the effect of seating the valve. The relay 231 and the valve 91 and their associated circuitry are tested by depressing the pushbutton 639, and similarly the relay 232 will close the valve 91 when the pushbutton 641 is depressed. The relay 235 and the valve 33 and their associated circuits are tested by depressing the pushbutton 642. To test the relay 236 and its associated circuit by lighting the lamp 396, the plug 459 should be removed from the receptacle 451 following which the pushbutton 643 should be depressed. All the relays can be further tested by inserting them in the test receptacle 613. When a relay is inserted in the receptacle 613, A.-C. current is supplied to each of the three blades of the relay through the contacts 613a, 613k and 613f and the lamps 616, 617, 618 which are connected to the normally closed terminals will light. When the relay test button 614 is depressed D.-C. voltage will be impressed across the coil of the relay being tested through the contacts 613b and 613j, moving the blades to light the lamps 619, 621, 622 and extinguish the lamps 616, 617 and 618.

I claim:

1. Apparatus for controlling the oil pressure in an electric cable comprising an A.-C. bus, a D.-C. bus, a plurality of magnetic relays energizable across said D.-C. bus, sensing means for sensing the conditions of said cable, said relays being responsive to said sensing means, a plurality of signal lamps energizable across said A.-C. bus by means of said relays, electric circuitry associated with each of said relays, at least one receptacle comprising a plurality of contacts, two of said contacts being electrically connected across said A.-C. bus, another two of said contacts being electrically connected across said D.-C. bus, a plurality of said contacts each being electrically connected to one of said relays, testing means comprising an A.-C. voltmeter connected to engage the contacts across said A.-C. bus, a D.-C. voltmeter connected to engage the contacts across said D.-C. bus, and switching means for energizing each of said relays and its associated circuitry across said D.-C. bus, whereby the voltage across said A.-C. bus and the voltage across said D.-C. bus may be tested and each of said relays and its associated circuitry may be tested without being removed from said apparatus.

2. Apparatus for controlling the oil pressure in an electric cable comprising an A.-C. bus, a D.-C. bus, a plurality of interchangeable, plug-in type magnetic relays, each having a plurality of pins, energizable across said D.-C. bus, sensing means for sensing the conditions of said cable, said relays being responsive to said sensing means, a plurality of signal lamps energizable across said A.-C. bus by means of said relays, electric circuitry associated with each of said relays, at least one receptacle, said receptacle comprising a plurality of contacts, a first two of said contacts being electrically connected across said A.-C. bus, a second two of said contacts being connected across said D.-C. bus, a plurality of the remainder of said contacts each being connected to one of said relays, a test unit comprising a housing, an A.-C. voltmeter mounted in said housing, pins electrically connected across said voltmeter matching said first two of said contacts for testing the voltage across said A.-C. bus, a D.-C. voltmeter mounted in said housing, pins electrically connected across said D.-C. voltmeter matching said second two of said contacts for testing the voltage across said D.-C. bus, a test receptacle mounted in said housing, said test receptacle matching said relays and comprising a plurality of test contacts, a plurality of test lamps each being connected to one of said test contacts whereby said relays may be tested after being inserted in said test receptacle, a first multipin jack matching said first receptacle, a second multipin jack matching said second receptacle, a first cable connecting said first jack to said housing, a second cable connecting said second jack to said housing, a plurality of push-buttons mounted on said housing, said push-buttons being so connected that when said first and second jack are respectively inserted in said first and second receptacle the depression of each of said pushbuttons will energize a different one of said relays by means of current from one of said buses, whereby said relays and their associated circuitry may be tested without removing said relays from said apparatus.

3. Apparatus for controlling oil pressure in an electric cable comprising a plurality of sensing means, a plurality of operating means, a plurality of signal means, and a remote alarm means, a plurality of magnetic relays interconnected with said sensing, operating, and signal means, at least one of said sensing means energizing both said signal means and said remote alarm means simultaneously, at least one receptacle having a plurality of contacts electrically connected to said relays, a multipin jack electrically connected to a plurality of pushbuttons, said jack fitting said receptacle, the operation of said pushbuttons serving to test said relays, said jack being inserted in said receptacle, and means, operated automatically by the insertion of said jack, preventing the energizing of said alarm means during the testing of said relays.

References Cited by the Examiner
UNITED STATES PATENTS

| | | | |
|---|---|---|---|
| 1,111,362 | 9/1914 | Carrigan. | |
| 2,127,343 | 8/1938 | Parlett. | |
| 2,309,174 | 1/1943 | Dodd | 340—213 |
| 2,377,569 | 6/1945 | Morse | 340—213 |
| 2,566,367 | 9/1951 | Peters | 340—214 |
| 2,576,892 | 11/1951 | Stanton. | |
| 2,625,597 | 1/1953 | Dodd | 340—256 |
| 2,685,684 | 8/1954 | Atkinson et al. | 340—256 |
| 2,697,824 | 12/1954 | Norton et al. | 340—214 |
| 2,736,004 | 2/1956 | Greene | 340—214 X |
| 2,839,741 | 6/1958 | Kratville | 340—214 |
| 2,930,031 | 3/1960 | Ungar | 340—240 |
| 3,025,504 | 3/1962 | Ohse | 340—240 |
| 3,040,243 | 6/1962 | Weiss. | |
| 3,159,747 | 12/1964 | Jones | 340—214 X |

NEIL C. READ, *Primary Examiner.*

R. M. ANGUS, D. YUSKO, *Assistant Examiners.*